United States Patent
Surpris

(10) Patent No.: US 10,813,732 B2
(45) Date of Patent: Oct. 27, 2020

(54) DENTAL TREATMENT DEVICE

(71) Applicant: Ernest Surpris, New Rochelle, NY (US)

(72) Inventor: Ernest Surpris, New Rochelle, NY (US)

(*) Notice: Subject to any disclaimer, the term of this patent is extended or adjusted under 35 U.S.C. 154(b) by 96 days.

(21) Appl. No.: 15/881,741

(22) Filed: Jan. 27, 2018

(65) Prior Publication Data

US 2019/0231498 A1   Aug. 1, 2019

(51) Int. Cl.
*A61C 17/22* (2006.01)
*A61C 17/02* (2006.01)
*A46B 11/06* (2006.01)
*A46B 9/04* (2006.01)

(52) U.S. Cl.
CPC .............. *A61C 17/222* (2013.01); *A46B 9/04* (2013.01); *A46B 11/063* (2013.01); *A61C 17/0202* (2013.01); *A46B 2200/1066* (2013.01)

(58) Field of Classification Search
CPC . A61C 17/222; A61C 17/227; A61C 17/0202; A61C 19/063; A61C 17/36; A61C 17/02; A61C 17/024; A61C 17/028; A61C 17/32
See application file for complete search history.

(56) References Cited

U.S. PATENT DOCUMENTS

| | | | | |
|---|---|---|---|---|
| 4,743,199 A | * | 5/1988 | Weber .............. | A46B 11/063 433/216 |
| 2005/0160541 A1 | * | 7/2005 | Goldfine ............ | A46B 17/08 15/22.1 |
| 2007/0113360 A1 | * | 5/2007 | Tsai .................. | A46B 5/0095 15/29 |
| 2010/0269281 A1 | * | 10/2010 | Gottenbos ........ | A46B 15/0002 15/167.1 |
| 2014/0349246 A1 | * | 11/2014 | Johnson ............ | A61C 17/02 433/80 |
| 2016/0193002 A1 | * | 7/2016 | Motoyama ......... | A61C 19/00 128/853 |
| 2018/0228584 A1 | * | 8/2018 | Sokol ............... | A61C 17/0202 |

* cited by examiner

*Primary Examiner* — Daniel J Colilla

(57) ABSTRACT

A dental treatment apparatus including a head assembly, the head assembly having a plurality of nozzles disposed on the head assembly, each of the plurality of nozzles to dispense a fluid therefrom and being maneuverable directionally independent of the other nozzles of the plurality of nozzles; and a plurality of bristles disposed on the head assembly in proximity to the plurality of nozzles.

15 Claims, 3 Drawing Sheets

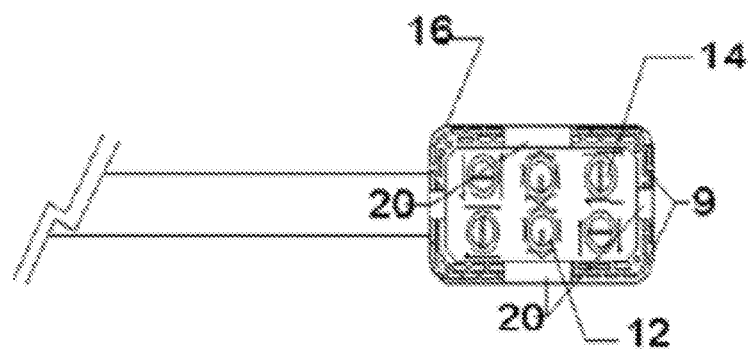
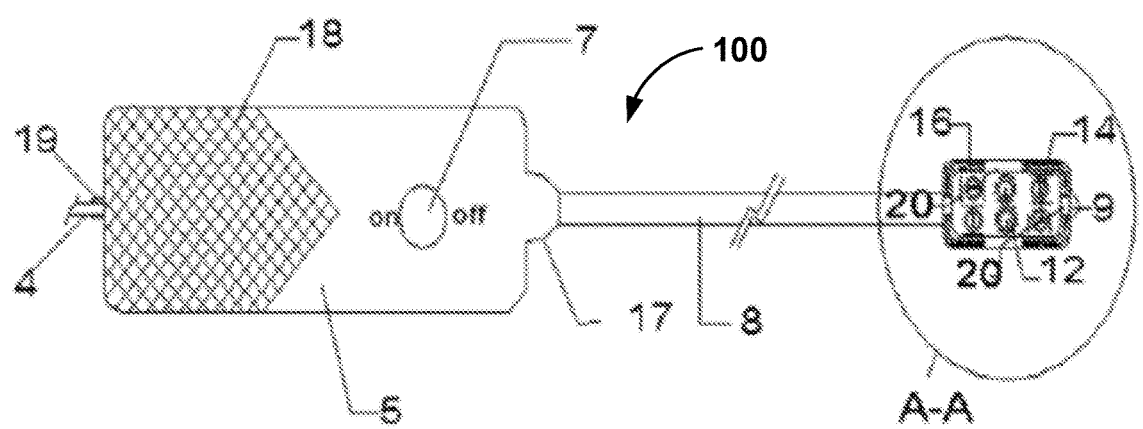
FIG. 1B
FIG. 1A

DENTAL TREATMENT DEVICE

BACKGROUND

The present disclosure generally relates to a dental treatment device, and in particular to an apparatus including combined features of a plurality of nozzles, bristles, and pressurized fluid.

It is well accepted that regular brushing and flossing of teeth provides health benefits. However, some individuals do not brush and/or floss their teeth regularly because it can be a time-consuming process. Still, other individuals might brush and/or floss regularly, but they do not use proper technique(s) needed to achieve the full benefits of brushing and flossing. Failing to brush and floss regularly and/or utilizing improper techniques in performing these tasks can lead to plaque build-up, gum disease, and other deleterious mouth conditions. Certain automated methods and tools for the cleaning of teeth and gums have been developed, such as water flossers and sonic toothbrushes, which are purportedly convenient to use and therefore encourage people to consistently and adequately clean their teeth.

Water flossers generally provide a stream of water through a tip that a user directs towards their teeth. Water flossers provide a clinically proven effective alternative to string floss. They are easier to use than string flossing, requiring less manual dexterity. One of the primary benefits of a water flosser is that the pulsating action of the water jet can expel subgingival bacteria from between teeth. However, the jet of water from a water flosser needs to be directed accurately between the teeth.

Another type of dental treatment device is a sonic toothbrushes that has a motion-creating mechanism to cause the brush head of the device to rotate or oscillate. While the known water flossers and sonic toothbrushes are each useful in certain aspects for teeth and mouth cleaning, each is limited in some other aspects. For example, a sonic toothbrush is good for removing plaque but cannot remove bacteria that is trapped under the gums. Existing water flossers are only effective for flossing and massaging. In order to optimally and efficiently maintain a healthy mouth and teeth, it is therefore presently necessary to employ two (or more) devices, namely a toothbrush and a flosser.

Therefore, there is a need for a single dental treatment device that is able to consistently, efficiently, and effectively treat or prevent ailments of the mouth, yet be convenient and easy to use.

BRIEF DESCRIPTION

In one aspect, an embodiment of the present disclosure relates to a dental treatment device including a head assembly, the head assembly includes a plurality of nozzles disposed on the head assembly, each of the plurality of nozzles to dispense a fluid therefrom and being maneuverable directionally independent of the other nozzles of the plurality of nozzles; and a plurality of bristles disposed on the head assembly in proximity to the plurality of nozzles.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1A and 1B are top views of an illustrative example embodiment of an apparatus in accordance with some aspects herein;

Figure 2B:
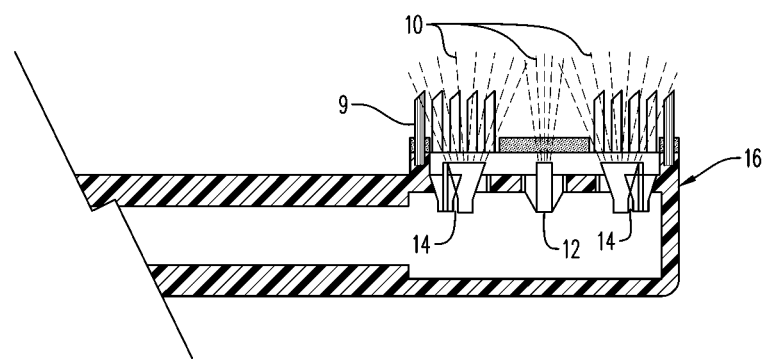
FIGS. 2A and 2B are cross section side views of an illustrative example of an apparatus in accordance with some aspects herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

Referring to FIG. 1A and the details shown in FIG. 1B, a device 100 comprising a head assembly 16, a body assembly 5 having an optional grip texture 18, a neck 8 connecting or otherwise coupling the head assembly 16 to the body assembly 5, a water line inlet 4 located at a distal end of device 100 and connected to water line port 19. In some embodiments, an on/off switch 7 is located on body assembly 5. Connected to the body assembly 5 in the example of FIG. 1A is a quick connect/disconnect assembly 17 to enable detachable removal of neck 8 and head 16 from body assembly 5. In some embodiments, the device may include a neck portion 8 that is detachably affixed to the head assembly. Such a connection may be convenient for cleaning purposes and to enable separate head assemblies to be used by different users (e.g., different members of a family).

Head assembly 16 in the example embodiment of FIGS. 1A and 1B have, disposed thereon or in, a plurality of nozzles 12 and 14 located generally on or in an interior area of head assembly 16, a plurality of water reflector bristles 9 located on head assembly 16 and surrounding the plurality of nozzles, and a plurality of teeth bumpers 20.

In reference to the example of FIGS. 1A and 1B, nozzles 12 may be moveable in a generally circular motion and nozzles 14 may be moveable in a generally liner motion. The plurality of nozzles 12, 14 may number, for example, from about 2 nozzles to about 8 nozzles. In some embodiments, the plurality of nozzles may include 2 to 7 individual nozzles and in some embodiments 2 to 6 nozzles. One embodiment contains 6 nozzles. In some aspects, the plurality of nozzles are each disposed in hollow portions or wells, within the head assembly of the device and below a planar surface of the head assembly. Each well may be separately connected to a pressurized water supply within head assembly 16 of the device. An end of head assembly 16 may be connected to a reservoir via a water pump.

In some embodiments, at least one of the plurality of nozzles 12, 14 may be positioned on head assembly 16 in proximity with a plurality of bristles 9 that are also attached to the head assembly. The plurality of bristles 9 may be disposed on head assembly 16 and surround nozzles 12, 14. The bristles 9 may project, in some embodiments, about 0.5 inch to about 1 inch above a surface of head assembly 16. In one embodiment, the bristles 9 might project about 0.75 inch. In some aspects, the bristles 9 may be positioned adjacent to and abutting the teeth of a user when the device is operably used.

Dental device 100 includes a body assembly 5 having a grip handle that contains an on/off switch 7 to regulate the flow of pressurized water through the device. In use, the device 100 may be held by the body assembly 5 and have a liquid (e.g., water) pump mechanism activated via switch 7. In some aspects, a fluid may flow through an apparatus disclosed herein and be dispensed therefrom under a pressure greater than the surrounding environment's ambient atmospheric pressure. The pressure with which the fluid is dispensed from the nozzles 12, 14 may operate to actuate or otherwise activate the independent maneuverability of the nozzles, whether the movement imparted to the nozzles is laterally (i.e., linearly) or circularly along at least a portion of a circle (i.e., arc). The laterally moving nozzles might move vigorously from left-to-right, right-to-left, up and down, and alternating combinations thereof. The circularly moving nozzles may operably rotate in a circular motion, in some embodiments, over about 90 degrees, about 120 degrees, about 180 degrees, about 270 degrees, and up to about 360 degrees along an arc in a plane of the head assembly of the device 100. In some aspects, the independent maneuverability of the plurality of nozzles 12, 14 operating under pressure may cause fluid to be directed outward from the head assembly of the dental treatment device in a combination and variety of different directions, including in some embodiments in a range of about 360 degrees.

In some embodiments, the plurality of nozzles 12, 14 are configured to dispense a fluid therefrom. In some aspects, the nozzles are directionally movable or maneuverable independently of each other. By being movable independently of each other, the plurality of nozzles 12, 14 can discharge fluid in different directions, wherein the direction of fluid dispensed from any one of the plurality of nozzles is independent of the other nozzles. In some embodiments, two or more of the nozzles 12, 14 move in different directions from each other. For example, in one embodiment at least one nozzle may move in a circular direction and at least one nozzle may move in a lateral or linear direction (i.e., back and forth, up and down, left-to-right, and right-to-left). In some embodiments, a majority of the plurality of nozzles may move laterally while the remaining nozzles move circularly. For example, if the device comprises six nozzles, then two may move in a circular motion and four in a lateral motion. In some other embodiments, a majority of the plurality of nozzles may move circularly while the remaining nozzles move laterally.

In some embodiments, head assembly 16 may have one or more teeth bumpers 20 (also simply referred to as bumpers herein). The bumpers may operate to maintain at least a minimum offset distance between the nozzles and a user (e.g., the teeth and/or gums of the user). In this manner, the bumpers herein might operate to prevent teeth and/or gums of a user from touching the nozzles, thereby allowing the nozzles to move freely and unimpeded. In some embodiments, a head assembly of a dental device herein may have one, at least two, four or more bumpers. In some aspects, the one or more teeth bumpers 20 are provided on head assembly 16 to protect teeth from touching the nozzles by keeping the teeth a minimum offset distance from the plurality of nozzles. For example, teeth bumpers 20 extend a greater height or length above a surface of the head assembly 20 than the plurality of nozzles 12 and 14. In some embodiments, the teeth bumpers 20 extend a greater height or length above a surface of the head assembly 16 than the plurality of nozzles 12 and 14 but less than the total length of bristles 9. In such embodiments, bristles 9 may be placed in contact with the teeth and/or gums of a user while the plurality of nozzles are held away from the teeth and/or gums of the user (i.e. at a minimum offset distance), thereby permitting the bristles to brush against the teeth and/or gums while allowing the plurality of nozzles to move unimpeded free from possible contact with the teeth and/or gums of the user.

The fluid supplied through a dental device herein may also provide a mechanism for dispensing a treatment liquid to the teeth. Preferred treatment liquids for the teeth may include, as an example, a liquid dentifrice, a liquid bactericide, fluoride, tartar control agents, whitening agents, other medicines, and combinations thereof.

When the device 100 is placed within the user's mouth and a pump mechanism is activated, the nozzles spray water from the water source against the teeth and gums of the user, removing plaque, massaging the gums, and improving the overall oral health of the user.

Referring now to FIG. 2 and the details shown in section A-A thereof, an example of an internal fluid delivery system of a dental device of the present disclosure is shown. In some embodiments, the pressurizing mechanism for the fluid supply may include a fluid pump 3 connected to a fluid reservoir 2 via a delivery tube or conduit. The delivery tube may be about ¼ inch diameter. In some embodiments, the fluid pump or other pressurization device is adapted to provide pulsating pumping of the fluid (e.g., water). In some embodiments, the fluid pressure is at least about 50 pounds per square inch (psi). In one embodiment, the pressure might be about 50 psi to about 90 psi. The illustrated fluid delivery system shown FIG. 3 includes a pressurization mechanism such as a motorized pump 3 that is supplied a fluid from the reservoir 2 that can store a quantity of fluid, a pump power (i.e., on/off) switch 1, and a pressure regulator 15. Connected to pump 3 is an outlet water line 4 that is connectable to a dental device 100, and more particularly to body assembly 5.

Figure 2A:
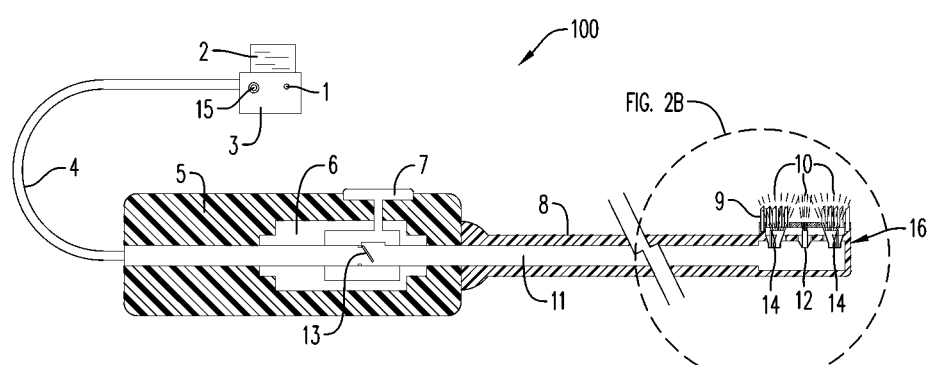

FIGS. 2A and 2B, similar to FIGS. 1A and 1B, show a head assembly 16 containing outwardly extending bristles 9 and teeth bumpers 20. In some embodiments, a first end of the head assembly 16 that connects to neck 8 is formed with a rectilinear or box-like shape constituting a female connector. In some embodiments, other types of connectors or coupling devices may be used and the shape of the head assembly may be differently configured.

In the example of FIG. 2A, a water passage or conduit 11 is depicted as extending along the length of device 100. A plurality of nozzles 12, 14 comprising small apertures are formed adjacent the bristles 9. It is noted that a termination location of the plurality of nozzles 12 and 14 is at an internally terminal portion of the passage 11. The passage 11 and apertures of nozzles 12, 14 together allow for the dissemination of fluid from passage and out through the nozzles towards, for example, the mouth and teeth of a user.

In some embodiments, body assembly 5 of device 100 includes a fluid release button 7. The fluid release button 7 may be positioned near one end of the water passage 11 in body assembly 5. Water release button 7 may have an upper end extending outwardly of body assembly 5. A lower end of water release button 7, when depressed or otherwise actuated, may open a gate valve or other fluid flow controller device 13.

In some embodiments, fluid release button 7 may be pressed downward into a valve assembly 6, thereby opening passage 11 to allow the unobstructed flow of fluid through passage 11 to the internal apertures of nozzles 12, 14 for the outward dissemination of fluid(s) therefrom. In some examples, pressing downwardly on release button 7a second time, will cause the valve 13 to disengage, thereby misaligning the apertures in valve 6 from the water passage 11 to stop the flow of water.

In operation as the fluid exits through the nozzles 12, 14 under pressure, the fluid may penetrate the spaces and crevices between teeth, underneath the gum line, and massage the gums for better blood flow. With minimal effort and/or particular alignment with the teeth by the user, the pressurized fluid directed to the teeth and gums under pressure in varying directions may operate to break down bacteria, reduce plaque, and dislodge debris in cracks, crevices, spaces, and cavities. The device of the present disclosure can consistently treat a variety of ailments of the mouth, including for example, gingivitis, gum disease, bleeding gums, swollen gums, bad breath, receding gums, weak dental bones, oral infections, and combinations thereof.

Figure 3:
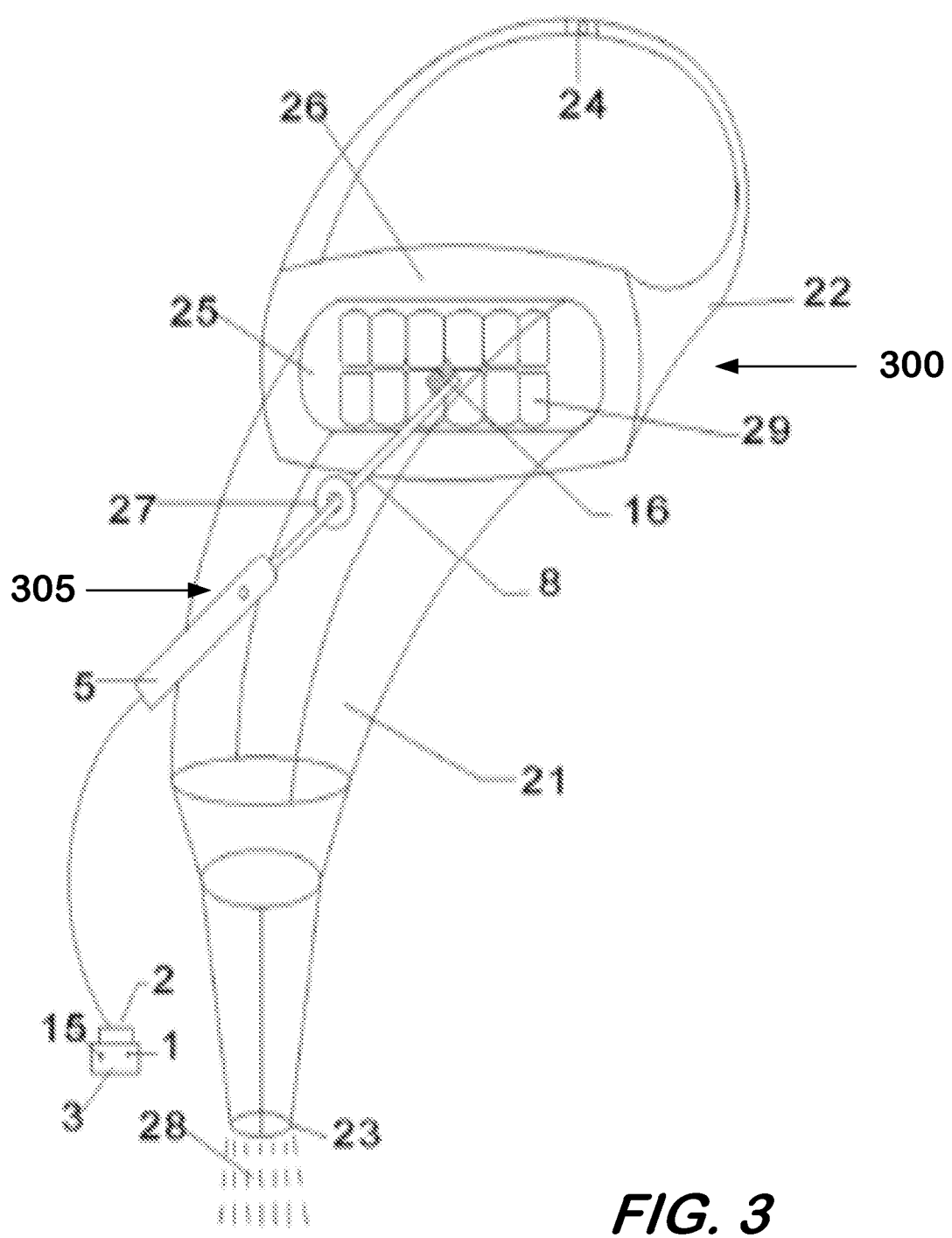
FIG. 3 is a front view of an illustrative example of an apparatus in accordance with some aspects herein.

FIG. 3 is an illustrative depiction of a front view of a mouth guard 300 that may be used, in some embodiments and use-cases, with a dental device as disclosed herein. In one embodiment, a dental device of the present disclosure may include a mouth guard having an opening sized and configured to fit over the mouth of a user. The mouth guard may be configured to drain the waste fluid(s) away from the mouth area of a user. FIG. 3 shows an example of mouth guard 300 being used in conjunction with a dental device 305. Mouth guard 300 provides a mechanism to control a flow of waste fluid(s) from device 305 and exiting the mouth of a user (not shown in FIG. 3). Similar in some respects to the dental devices disclosed in FIGS. 1 and 2, dental device 305 includes a water delivery system comprising a motorized pump 3, a fluid reservoir 2 for fluid storage, a power on/off switch 1, and a pressure regulator 15. Connected to pump 3 is an outlet water supply line connected to the dental device body assembly 5. The mouth guard 300 of FIG. 3 includes of a guard body 26 that covers an area surrounding the mouth of a user and an opening 25 in the guard body 26 to allow access to a user's mouth when mouth guard 300 is positioned with opening 26 aligned with the user's mouth. When positioned as shown in FIG. 3, mouth guard 300 and more particularly opening 26 shields the area surrounding a user's mouth while providing access to the user's teeth and gums through opening 26 such that dental device 305 may be operatively used to interact, message, and clean teeth 29 as a result of fluid being dispensed from dental device 310 under operating pressure(s) thereof. Mouth guard 300 includes a waste fluid channel 21 that provides a conduit for channeling waste (e.g., excess) fluids away from dental device 305 and a user's mouth. Fluid exits mouth guard 300 via waste fluid exit port 23. In some use-cases, waste fluid exit port 23 may be positioned in or near a sink such that waste fluids might flow into the sink.

In some embodiments, mouth guard 300 includes a mouth guard strap 22 that is permanently or removably attached to mouth guard body 26. The example of FIG. 3 includes a strap lock 24 for selectively fastening and unfastening mouth guard 300 around the neck and/or head of a user. When it is being operated, the neck 8 of the device may be inserted through a sealed opening 27.

The dental device 305 shown in FIG. 3 utilizes pressurized fluid delivered from a fluid pump mechanism. Dental device 305 includes a body assembly 5, a detachable neck 8 and a head assembly 16 having bristles, nozzles, and teeth bumpers, as disclosed in FIGS. 1 and 2.

This written description uses examples to disclose the embodiments, including the best mode, and also to enable any person skilled in the art to practice the embodiments, including making and using any devices or systems and performing any incorporated methods. While the invention has been described with reference to specific embodiments thereof, it will be understood by those skilled in the art that various other changes in the size, materials, shape, form, function and manner of operation, assembly and use may be made without departing from the spirit and scope of the invention, as defined in the appended Claims. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dental treatment apparatus, the apparatus comprising:
a head assembly, the head assembly comprising:
a plurality of moveable nozzles disposed within the head assembly below a planar surface of the head assembly, each of the plurality of nozzles to dispense a fluid therefrom and being maneuverable directionally independent of the other nozzles of the plurality of nozzles, the plurality of nozzles dispensing the fluid therefrom in response to a pressure greater than an ambient atmospheric pressure being supplied to the plurality of nozzles wherein the pressure actuates the directional maneuverability of each of the plurality of nozzles;
a plurality of bristles disposed on and projecting above the planar surface of the head assembly, the plurality of bristles being located along a peripheral region of the head assembly surrounding the plurality of nozzles; and
at least one bumper disposed on and projecting above the planar surface of the head assembly, the at least one bumper being located along the peripheral region of the head assembly surrounding the plurality of nozzles, the at least one bumper to maintain at least a minimum offset distance between the plurality of nozzles and a user.

2. The apparatus of claim 1, wherein the pressure is about 50 pounds per square inch to about 90 pounds per square inch.

3. The apparatus of claim 1, wherein the pressure pulsatingly varies.

4. The apparatus of claim 1, wherein the plurality of nozzles are moveable in at least one of a linear motion and circular motion.

5. The apparatus of claim 4, wherein the linear motion includes at least one lateral movement.

6. The apparatus of claim 4, wherein the circular motion includes movement along an arc of at least about 180 degrees.

7. The apparatus of claim 4, wherein the circular motion includes movement along an arc of at least about 270 degrees.

8. The apparatus of claim 1, wherein the at least one bumper projects a height above the planar surface of the head assembly greater than at least the minimum offset distance to be maintained between the plurality of nozzles and a user.

9. The apparatus of claim 8, wherein the at least one bumper is located adjacent to at least one of the plurality of nozzles.

10. The apparatus of claim 1, wherein the fluid is at least one of water, a liquid dentifrice, a liquid bactericide, a medicine, and combinations thereof.

11. The apparatus of claim 1, further comprising a body assembly connected to the head assembly, the body assembly supporting at least an activation switch device.

12. The apparatus of claim 11, further comprising a neck coupling the body assembly to the head assembly, the neck providing fluid communication for the fluid between the body assembly and the head assembly.

13. The apparatus of claim 1, further comprising a mouth guard, the mouth guard having an opening configured to fit around a mouth of a user.

14. The apparatus of claim 1, further comprising:
   a fluid supply;
   a fluid pump; and
   a fluid supply line coupling the fluid supply to the head assembly.

15. A dental treatment apparatus, the apparatus comprising:
   a head assembly, the head assembly comprising:
      a plurality of nozzles disposed within the head assembly below a planar surface of the head assembly, each of the plurality of nozzles to dispense a fluid therefrom, the plurality of nozzles dispensing the fluid therefrom in response to a pressure greater than an ambient atmospheric pressure being supplied to the plurality of nozzles;
   a plurality of bristles disposed on and projecting above the planar surface of the head assembly, the plurality of bristles being located along a peripheral region of the head assembly surrounding the plurality of nozzles; and
   at least one bumper disposed on and projecting above the planar surface of the head assembly, the at least one bumper being located along the peripheral region of the head assembly surrounding the plurality of nozzles, the at least one bumper to maintain at least a minimum offset distance between the plurality of nozzles and a user.

* * * * *